Figure 1:
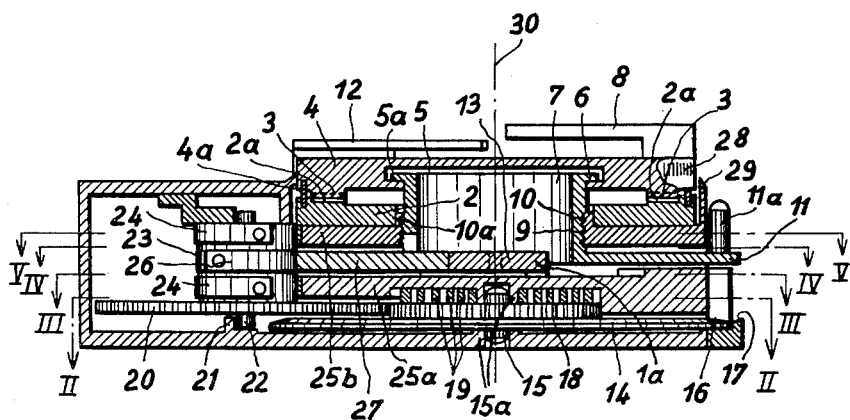

April 3, 1962     G. ZIEHER     3,027,645
GONIOMETERS

Filed June 23, 1959     4 Sheets-Sheet 1

April 3, 1962 G. ZIEHER 3,027,645
GONIOMETERS
Filed June 23, 1959 4 Sheets-Sheet 4

United States Patent Office 3,027,645
Patented Apr. 3, 1962

3,027,645
GONIOMETERS
Gustav Zieher, Aalen, Wurttemberg, Germany, assignor to Carl Zeiss, Oberkochen, Wurttemberg, Germany
Filed June 23, 1959, Ser. No. 822,248
5 Claims. (Cl. 33—1)

The invention relates to an improvement in a goniometer and particularly is directed to a goniometer provided with two oppositely rotatable measuring legs. The conventional gonimeters of this type provide for a continuous rotative movement of one leg of the measuring jaws, whereby the angle of rotation is read on a scale. This type of measuring an angle is, however, relatively inaccurate, because it is not possible to subdivide the scale in sufficient small increments. If, however, a step-down gearing for the movement of the measuring leg is provided, then the unavoidable inaccuracies in the step-down gearing are reflected in errors in the measuring results.

In order to overcome the above disadvantages of the conventional goniometer of the type mentioned, there have been developed optical goniometers in which a rotatable scale is viewed by means of a magnifying glass or a microscope so that as a result of the magnification it is possible to make finer or more accurate readings. In view of the optical elements, however, goniometers of this type are rather expensive.

It is an object of the present invention to produce a goniometer which operates exclusively in accordance with mechanical principles and yet produces very accurate readings.

The goniometer of the present invention is characterized by the feature that the measuring legs are able to be adjusted coarsely and finely. For the purpose of making a coarse adjustment a gear clutch is provided, while for the purpose of a fine adjustment a step-down gearing is provided. Furthermore, the gears of the step-down gearing are connected with one another by tapes in such a manner that they may roll one upon the other.

Such a goniometer when constructed in accordance with the present invention will produce very accurate results. In accordance with the invention, the coarse adjustment is effected by means of a gear clutch which is constructed in such a manner that very accurate angular adjustments may be made, while on the other hand in view of the employed tape connections in the step-down gearing any play or dead movement is eliminated.

The step-down gearing which is employed in the goniometer of the present invention consists of a roller which rolls along a stationary circular body and also along a circle sector which carries a measuring leg. Such gearings are known as planetary gearings except that in the present case there are employed gear wheels. It is well known that these gearings permit a very great step-down ratio.

The gear clutch consists of two horizontally positioned and superimposed gear wheels provided on the faces directed toward each other with radial teeth which are adapted to be brought into engagement with each other. It is of advantage when at least in one of these gear wheels the bottom of the spaces between the teeth is cut away or recessed. When this is done, the teeth of the gear wheel are projected freely into space and in this manner they have a certain elasticity. Thereby it is avoided that an inaccurate position of one of the teeth of the gear wheel with respect to the rigid teeth of the other gear wheel causes an incorrect rotative position of the measuring leg. It is also possible to provide both gear wheels with radial elastic teeth.

In accordance with modified construction of the goniometer of the invention, the reading of the fine measuring value is taken from a spirally shaped scale and the measuring value itself is indicated by an axially slidable pointer which follows the spiral scale. In addition, this axially movable pointer is also pivotally mounted for adjusting purposes. Such an adjustment is necessary when the tapes which connect the bodies rolling upon one another have thickness differences, because such thickness variations change the transmission ratio and when the mentioned fine reading scale is used, incorrect values would be read off. This, however, can be easily compensated by a pivotally mounted pointer in that for instance a 1° adjustment of the axis of the pointer is arranged so that the same passes through the zero point and also through the 1° point on the fine measuring scale.

The drawing shows by way of example two embodiments of the invention.

Figure 2:
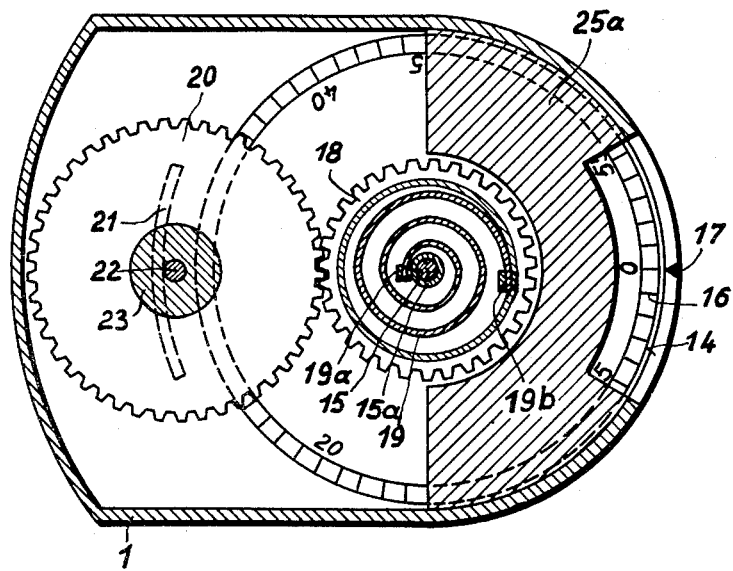
Figure 3:
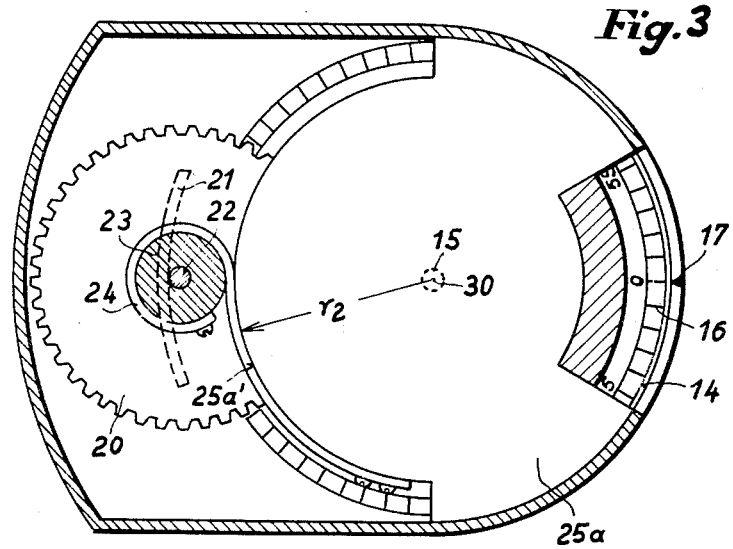
Figure 4:
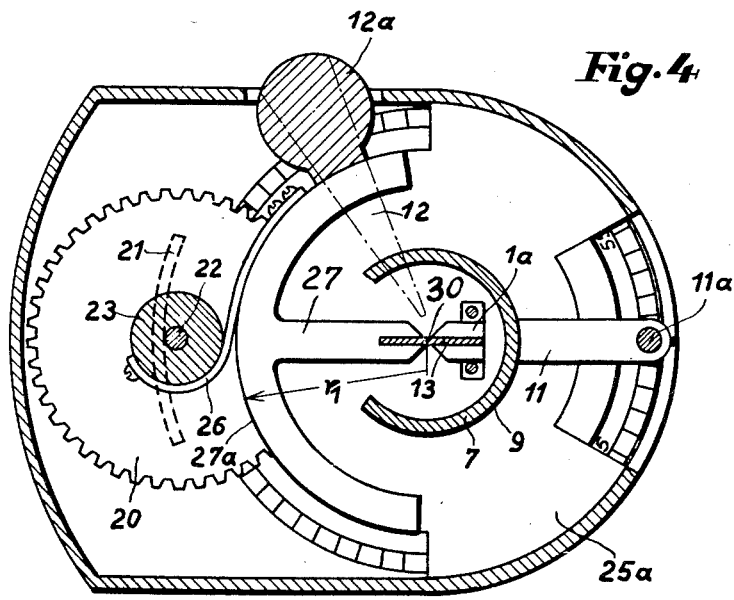
Figure 5:
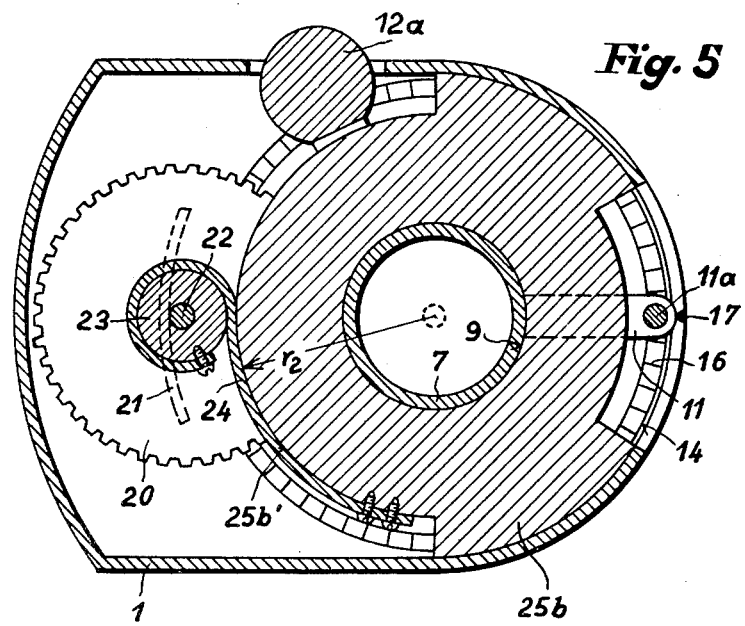
Figure 6:
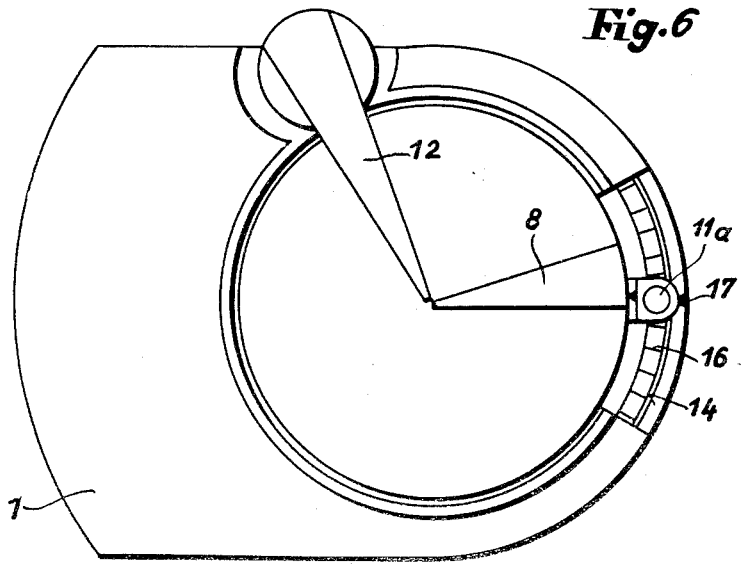
Figure 7:
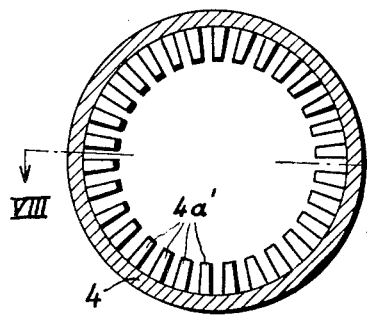
Figure 8:
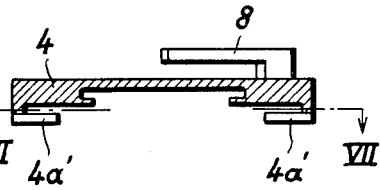
Figure 9:
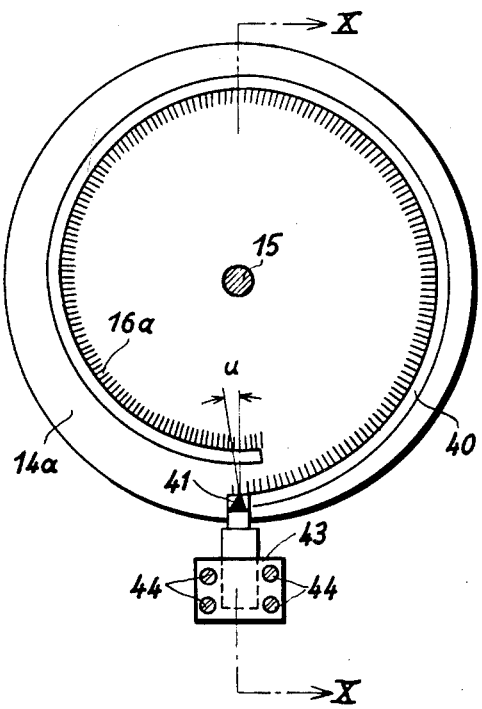
Figure 10:
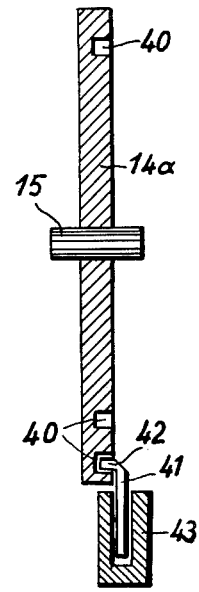

FIG. 1 illustrates a vertical sectional view of the goniometer.
FIG. 2 is a section along the line II—II of FIG. 1.
FIG. 3 is a section along the line III—III of FIG. 1.
FIG. 4 is a section along the line IV—IV of FIG. 1.
FIG. 5 is a section along the line V—V of FIG. 1.
FIG. 6 is a top view of the goniometer shown in FIG. 1.
FIG. 7 is a section along the line VII—VII of FIG. 8.
FIG. 8 is a section along the line VIII—VIII of FIG. 7.
FIG. 9 illustrates a modified fine measuring scale having a spiral shape.
FIG. 10 illustrates a sectional view along the line X—X of FIG. 9.

Referring to the drawing and particularly to FIG. 1, the goniometer is provided with a box-like housing 1 in the upper portion of which is fixedly mounted a gear wheel 2 having the shape of a horizontally disposed circular plate on the upper face of which are arranged 360 radial teeth 2a. Above this gear wheel 2 is positioned another horizontal gear wheel 4 of the same size. Both gear wheels are held in axial alignment by means of a circular tape 4a, the edges of which engage circular grooves in the opposite faces of the gear wheels 2 and 4 respectively. The centers of the gear wheels 2 and 4 are positioned in the vertical axis 30. The gear wheel 4 is provided on its lower face with radial teeth 3 which are adapted to mesh with the teeth 2a of the lower gear wheel 2. The lower face of the gear wheel 4 is provided with a central circular recess 5, the bottom of which extends into an inner annular groove 5a. A vertical tubular shaft 7 is provided on its upper end with an outwardly extending flange 6 which extends into the groove 5a of the gear wheel 4. The tubular shaft 7 is adapted to be axially adjusted in vertical direction. When the shaft 7 is moved upwardly in vertical direction then the flange 6 therein will raise the gear wheel 4 upwardly so that the teeth of the latter will be disconnected from the teeth 2a of the gear wheel 2. Thereupon the gear wheel 4 may be rotated by hand about an angle and then may be lowered again so as to reengage the gear wheel 2. The gear wheel 4 carries on its upper face the radially disposed leg 8 of the measuring jaws of the goniometer. The tubular shaft 7 is provided near its lower end with an exterior thread 9 meshing with the interior thread 10 of a stationary sleeve 10a forming a portion of the housing 1. The tubular shaft 7 is provided at its lowermost end with an outwardly extending horizontal arm 11 provided with an upwardly extending handle 11a. When this arm 11 is moved about the axis 30 then the tubular shaft 7 owing to its threaded engagement with the thread 10 moves in axial direction either upwardly or downwardly.

The angular rotative movement of the measuring jaws 8 is indicated on the scale 28 by means of an index mark 29. The scale 28 is divided into degrees.

Opposite the measuring jaw 8 and cooperating therewith is arranged a radially disposed leg 12. The latter is connected with a vertically positioned leaf spring 13 fixedly connected with a part 1a of housing 1. The spring supports a body 27 with a circular surface 27a. Spring 13 is adapted to kink in the axis 30 of the goniometer. In this manner it is possible to supplement the coarse adjusting steps of the leg 8 by very fine adjustments of the leg 12. In order to effect such a fine adjustment, a circular disc 14 which is rotatably mounted about the axis 30 in the lower portion of the housing 1 is manually rotated. This circular disc 14 is provided with a center pin 15 which is rotatably mounted in a bearing socket 15a in the bottom wall of the housing 1. On the outer circumference of the circular disc 14 is arranged a scale 16 which cooperates with an index mark 17 on the housing 1 for reading the fine adjustment. The circular disc 14 has fixedly attached to its upper face in axial alignment therewith a gear 18. This gear is subject to the action of a spiral spring 19 arranged above the gear 18. The spring 19 is fixedly connected with its one end to a part 19a of housing 1 and with its other end to a part 19b of gear 18. The spring 19 eliminates any play or idle movement in the gear connection. The gear 18 meshes with a gear 20 carrying a center pin 22. This center pin 22 engages with its circumference an abutment rail 21 which prevents a radial displacement of the gear 20 away from engagement with the gear 18. As shown in FIG. 2, this abutment rail 21 has the shape of an arc having its axis coincident with the axis 30 of the goniometer. The gear 20 has fixedly connected in axial alignment therewith a roller 23 which according to FIG. 1 is arranged above the gear 20. This roller 23 has attached thereto in spaced superposed relation two tapes 24 which also are connected with stationary sector shaped bodies 25a and 25b as illustrated in FIGS. 3 and 5. The bodies 25a and 25b have circular surfaces 25a' and 25b'. When the gear 20 rotates the roller 23, then the tapes 24 are wound upon the surfaces 25a' and 25b' of bodies 25a and 25b or are unwound from the latter respectively. This has the result that the roller 23 rolls along the curved circumference of the bodies 25a and 25b and when this takes place, the bearing pin 22 of the gear 20 moves along the abutment rail 21 (see FIG. 2).

The roller 23 is additionally connected by means of a tape 26 which is positioned between the two tapes 24, with a sector 27 having a circular surface 27a. This sector 27 is connected with the leaf spring 13 (FIG. 4). A body 12a carrying leg 12 is fixedly connected to the circular surface 27a of the body 27. When the roller 23 rolls along the curved circumference of the bodies 25a and 25b then the tape 26 pulls the body 27 about the axis 30 of the device. This causes an adjustment of the leg 12 of the measuring jaws about the axis 30. The rotative adjustment range of the leg 12 is approximately 1°. In order to effect this adjustment, the circular disc 14 has to perform about one complete revolution. The radius $r_1$ of the circle sector 27 is somewhat greater than the radius $r_2$ of the sector body 25. In this manner the mentioned large ratio is obtained. Therefore the scale 16 can be subdivided in rather large intervals so that small movements of the leg 12 of the measuring jaws may be read very accurately on the scale.

The FIGS. 7 and 8 illustrate the gear wheel 4 provided with elastic gear teeth 4a'. A portion of the radial lands between these gear teeth is removed and therefore the gear teeth enter particularly well into the spaces between the teeth of the gear wheel 2.

In the FIGS. 9 and 10 is illustrated a somewhat different embodiment of the fine measuring scale in that the circular disc 14a is provided with a spiral groove 40 extending near the circumference of the disc 14a. Along this spiral groove 40 are arranged the graduation lines of the scale 16a. A pointer 41 is provided with a lateral extending projection 42 which extends into the spiral groove 40. Since the pointer 41 is mounted with its other portion lengthwise slidable in a holder 43, which is mounted substantially radially with respect to the disc 14a, it is obvious that the pointer 41 may follow the shape of the spiral groove 40 when the disc 14a is rotated. The holder 43 is attached to the housing of the device by means of screws 44 or the like. Upon loosening these screws 44, the holder 43 can be disposed somewhat inclined so that the pointer 41 may be tilted for instance about an angle $u$. When now the circular disc 14a is rotated the pointer 41 does no longer indicate the value 1°, but according to FIG. 9 it will indicate two graduation lines less. The difference created in this manner may be used to compensate any variations in the step-down gearing caused for instance by variable thicknesses of the tapes.

The two measuring jaws may be eliminated when for the adjustment two microscopes with linear indices are used.

What I claim is:

1. In a goniometer, a housing, two oppositely rotatable horizontally positioned measuring legs rotatably adjustably supported by said housing about a common vertical axis, means forming a gear clutch in said housing, said gear clutch including two superimposed horizontally disposed gear wheels provided with radial gear teeth on the faces which are opposite each other, the upper one of said two gear wheels carrying on its upper face one of said measuring legs adapted to be coarsely adjusted by a disengagement of one of said gear wheels from the other, a rotation of one of said gear wheels and a re-engagement of said gear wheels, means in said housing and arranged below said clutch forming a step-down gearing, said gearing including rotary members connected with each other by tapes which cause said rotary members to roll upon each other, and means for operatively connecting said step-down gearing with said other rotatable measuring leg to effect a fine adjustment of the latter about said common axis.

2. A goniometer as claimed in claim 1, in which said means for operatively connecting said step-down gearing with said other rotatable measuring leg includes a rotary circular member and means for rolling the same along the circumference of a stationary circular body and along the circumference of a circle sector on which said finely adjustable measuring leg is fixedly mounted.

3. A goniometer as claimed in claim 1, including means for axially moving one of said gear wheels to move it out of engagement with said other gear wheel for a manual rotative adjustment relatively to said other gear wheel and a reengagement of said gear wheels.

4. A goniometer as claimed in claim 1, in which said gear clutch includes two superimposed horizontally disposed gear wheels provided with radial gear teeth on the faces which are opposite each other, the upper one of said two gear wheels carrying on its upper face one of said measuring legs, and means for axially moving one of said gear wheels to move it out of engagement with said other gear wheel to permit a rotative adjustment of the same relatively to said other gear wheel, said means being operative to cause a reengagement of said gear wheels, at least one of said gear wheels having a portion of the radial lands between its radial teeth removed.

5. A goniometer as claimed in claim 1, including within said housing a manually rotatable disc fixedly connected to one gear of said step-down gearing and provided with a fine measuring scale extending spirally about said common axis, and a radially disposed pointer member arranged to follow said spirally extending fine measuring scale, means for slidably supporting said pointer member on said housing in substantially radial direction, and means for tilting said slidable support for making adjustments of the latter relative to the zero mark of said fine measuring scale.

References Cited in the file of this patent

UNITED STATES PATENTS

| | | |
|---|---|---|
| 1,380,945 | Brown | June 7, 1921 |
| 2,673,401 | Bradner | Mar. 30, 1954 |
| 2,756,599 | Sperber | July 31, 1956 |
| 2,921,487 | Schabot | Jan. 19, 1960 |

FOREIGN PATENTS

| | | |
|---|---|---|
| 416,286 | Italy | Nov. 23, 1946 |
| 652,927 | Great Britain | May 2, 1951 |

UNITED STATES PATENT OFFICE
CERTIFICATE OF CORRECTION

Patent No. 3,027,645                      April 3, 1962

Gustav Zieher

It is hereby certified that error appears in the above numbered patent requiring correction and that the said Letters Patent should read as corrected below.

In the heading to the printed specification, between lines 5 and 6, insert "Claims priority, application Germany June 25, 1958 --.

Signed and sealed this 26th day of February 1963.

EAL)
test:

STON G. JOHNSON                      DAVID L. LADD testing Officer                         Commissioner of Patents